United States Patent [19]

Seong et al.

[11] Patent Number: 5,541,750
[45] Date of Patent: Jul. 30, 1996

[54] COLOR FILTER FOR A LIQUID CRYSTAL DISPLAY USING AT LEAST ONE OF ACID RED 52, ACID RED 486, AND RHODAMINE 6 GCT

[75] Inventors: Yeon-guk Seong, Anyang; Yong-hyeon Nam, Kyunggi-do; Chun-sik Kim, Kyunggi-do; Jae-wu Bae, Kyunggi-do, all of Rep. of Korea

[73] Assignee: Samsung Electron Devices Co., LTD., Kunggi-do, Rep. of Korea

[21] Appl. No.: 804,729

[22] Filed: Dec. 11, 1991

[30] Foreign Application Priority Data

Dec. 13, 1990 [KR] Rep. of Korea .................. 90-20516
Dec. 18, 1990 [KR] Rep. of Korea .................. 90-20972

[51] Int. Cl.[6] .................................................. G02F 1/1335
[52] U.S. Cl. ............................................................. 359/68
[58] Field of Search ............................................... 359/68

[56] References Cited

U.S. PATENT DOCUMENTS 4,470,667  9/1984  Okubo et al. ......................... 359/68

Primary Examiner—William L. Sikes
Assistant Examiner—James A. Dudek
Attorney, Agent, or Firm—Leydig, Voit & Mayer

[57] ABSTRACT

A color filter for a liquid crystal display comprising a pair of substrates each having a transparent electrode formed thereon is provided. The color filter comprising coloring materials and resins provided on at least one of the substrates, further comprises at least one dye selected from among acid red 52, acid red 486 and rhodamine 6 GCT.

15 Claims, 4 Drawing Sheets

1

COLOR FILTER FOR A LIQUID CRYSTAL DISPLAY USING AT LEAST ONE OF ACID RED 52, ACID RED 486, AND RHODAMINE 6 GCT

FIELD OF THE INVENTION

The present invention relates to a color filter for a liquid crystal display (LCD), and particularly to a color filter for an LCD which has a high color purity and wide color reproducing range, achieved by lowering light transmittance at a specific wavelength region.

BACKGROUND OF THE INVENTION

An LCD is a display device utilizing the electro-optic effect of changing the molecular-orientation of a liquid crystal according to an electric field and is widely used because it operates at a low voltage, uses little electric power and facilitates in designing the size of a display pattern.

As shown in FIG. 1, a common LCD comprises a pair of substrates (2, 9) made of transparent plates such as glass plates and plastic plates, transparent electrodes (3, 6) provided on the inner surface of the substrates, liquid crystal (5) interposed between the transparent electrodes (3, 6), spacers (4) which maintain the space between the two substrates (2, 9) and red, green and blue color filters (8) of proper thickness to show appropriate spectral characteristics. A light-intercepting layer between each color filter as needed and a protective layer (7) on the surface of the filter are provided polarization plates 1, 10 are disposed as outer walls for controlling light transmittance.

Backlight (11) exposed to the LCD stimulates the 10 μm thick liquid crystal (5) morecules interposed between the two electrodes (3, 6) light then passes through the color filter (8) to reproduce each color.

Usually a color filter for each color pattern is formed on the surface of a substrate by photolithography. The color filter is a core part in reproducing color patterns in LCDs such as STN LCD, TFT LCD etc., by transmitting fed, green and blue lights selectively from the backlight through a TFT drive.

Many methods for manufacturing color filters are well known. U.S. Pat. No. 4,802,743 discloses an LCD which is excellent in its durability and quality of display. The LCD employs a color filter formed by photolithography of a color resin comprising a coloring material dispersed in a low temperature-curing polyamino resin containing in its molecule a photosensitive group. U.S. Pat. No. 4,837,098 discloses a color filter formed by using a coloring material which is soluble in polyimide solution and eliminating a protective layer.

FIG. 2 illustrates a spectrum of a backlight for a conventional LCD. The backlight posessess certain inherent characteristics. Therefore, it is impossible to change the whole spectrum of the LCD and only a slight peak change can be made. Among the spectrum of the backlight, light components for blue color in the 400 to 500 nm wavelength region, green color in the 520 to 560 nm wavelength region and red color in the 600 nm and above are necessary to reproduce real colors.

The role of a red color filter is to transmit the light of the wavelength region of 600 nm and above and absorb the light of the wavelength region of 600 nm and below.

The conventional red color filter has the light transmitting spectrum of 3a shown in FIG. 3A, and when the backlight, whose spectrum is shown in FIG. 2, is transmitted through the conventional red color filter, the spectrum of 4a in FIG. 4A is obtained. As shown in FIG. 4A, the transmittance of the conventional red color filter is high at the 450 to 570 nm wavelength region in the visible light portion of the spectrum and so the green component, having a main peak of 545 nm, stands out with the red component. Hence, the light color from the red color filter no longer shows pure red but orange-side red color, giving rise to the problem of being ineffective as a red color filter.

As an example, a color filter employing conventional dyes, such as red 21P(Nippon Kakaku Co., Ltd.), DFR 02-21 (Fuji Chemical Co., Ltd.) and dyes having similar characteristics, has high transmittance at the 500 to 560 nm wavelength region and the orange-side red color in the reproduced image deteriorates the image quality. As in the red color filter, when a blue color filter plays the role of high transmittance at the wavelength region of 500 nm and below, and high absorbance at the wavelength region of 500 nm and above, blue color of high purity can be reproduced.

However, the conventional blue color filter, made of such dyes as blue 5P (Nippon Kakaku Co., Ltd.), DFB( Fuji Chemical Co., Ltd.) and so on, has a spectrum showing the light transmittance as 3c shown in FIG. 3B. FIG. 4B illustrates the spectrum showing the light transmittance (4c) when the conventional blue color filter transmits a backlight. The conventional blue color filter also has high transmittance at the 500 to 600 nm wavelength region and the green component together with the blue component in the backlight stands out, making the reproduction of pure blue difficult. Therefore, the mixed colors of blue and green comes out in the region where the blue color should be reproduced and this deteriorates the color purity.

SUMMARY OF THE INVENTION

An object of the present invention, when the above-mentioned problems are considered, is to improve the red and blue color purity by lowering the light transmittance at the 450 to 600 nm wavelength region among the visible light.

To achieve the above-mentioned object of the present invention, there is provided a color filter for an LCD comprising a pair of substrates each having a transparent electrode formed thereon, the color filter comprising coloring materials and resins provided on at least one of the substrates, wherein the color filter further comprises at least one dye selected from the group consisting of acid red 52, acid red 486 and rhodamine 6 GCT.

The color filter is a red or blue color filter and the amount of the dye preferably ranges from 0.001 to 10 ppm based on total weight of the color filter composition.

It is preferred that the transmittance at the 450 to 570 nm wavelength region be 20% or below when the color filter transmits the backlight.

DETAILED DESCRIPTION OF THE INVENTION

Figure 1:
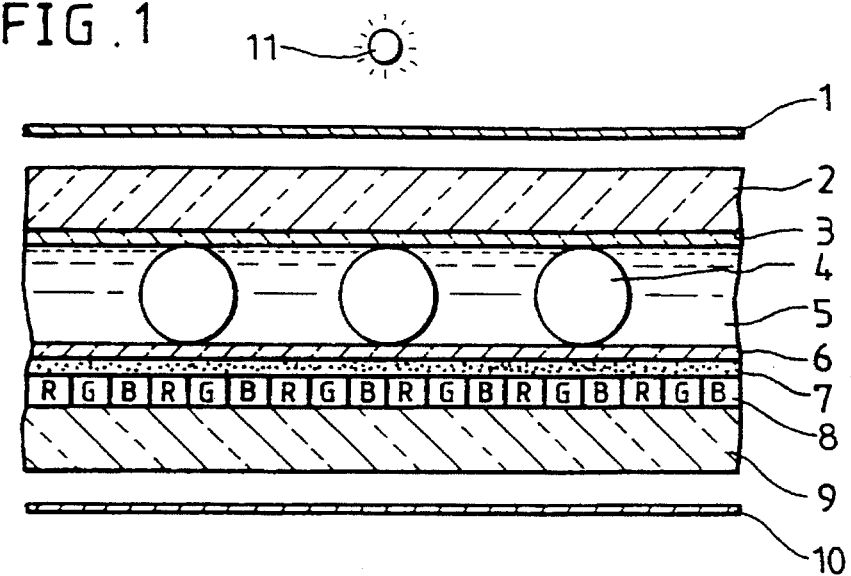
FIG. 1 is a sectional view of a conventional color LCD.

Now the method for manufacturing the color filter for LCD of the present invention will be described in detail below.

Commonly used dyes are mixed together with polyimide or polyimide resin. As red dyes, red 21P, DFR 02-1C, and solvent red 122, etc. can be used and as blue dyes, blue 5P, acid blue 129, solvent blue 49, solvent blue 25, and acid blue 9, etc. can be used. As much dye as possible is preferably used to provide a thick color. However, if the amount is unduly excessive, there is the disadvantage that the dyes escape into the photoresist at a later step, so it is appropriate that the amount of polyamide or polyimide ranges from 10 to 50 weight percent. It is more preferable that the amount of dyes used be equal to that of the polymers in terms of weight percent.

At least one dye selected from the group consisting of acid red 52, acid red 486 and rhodamine 6 GCT is added to the mixture obtained for the red and blue color filter and the whole mixture is agitated until it becomes homogeneous. The amount of this dye mixed is adjusted so that the filter made of the dye will sufficiently absorb the light of the undesirable wavelength region of the backlight. The preferred amount of the dye mixed ranges from 0.001 to 10 ppm based on the total amount of the color filter composition.

A method for coating the filter composition to manufacture the color filter for an LCD can be any one of a dyeing method, pigment dispersion method, printing method, interference method and electrocuting method.

When employing the dyeing method to manufacture the color filter of the present invention, conventional processes of photoresist coating, prebaking, exposing, and developing are applied to the above-mentioned filter composition to coat and form each color filter on the surface of a substrate. When employing the pigment dispersion method to manufacture the color filter of the present invention, the above-mentioned filter composition is dispersed in solvent-soluble resins. Polymer and photosynthetic initiator are added to the mixture, and the substrate is coated to the thus obtained colored-resist to follow an exposing process by using a photo-mask to obtain the desired color filter.

Alternatively, a color filter of the present invention can be obtained by coating a mixture of a dye selected from the group consisting of acid red 52, acid red 486 and rhodamine 6 GCT, and polyamide or polyimide, on the surface of each color filter conventionally obtained.

The red and blue color filter manufactured by the above mentioned methods absorbs the backlight at the 450 to 600 nm wavelength region.

Figure 3A:
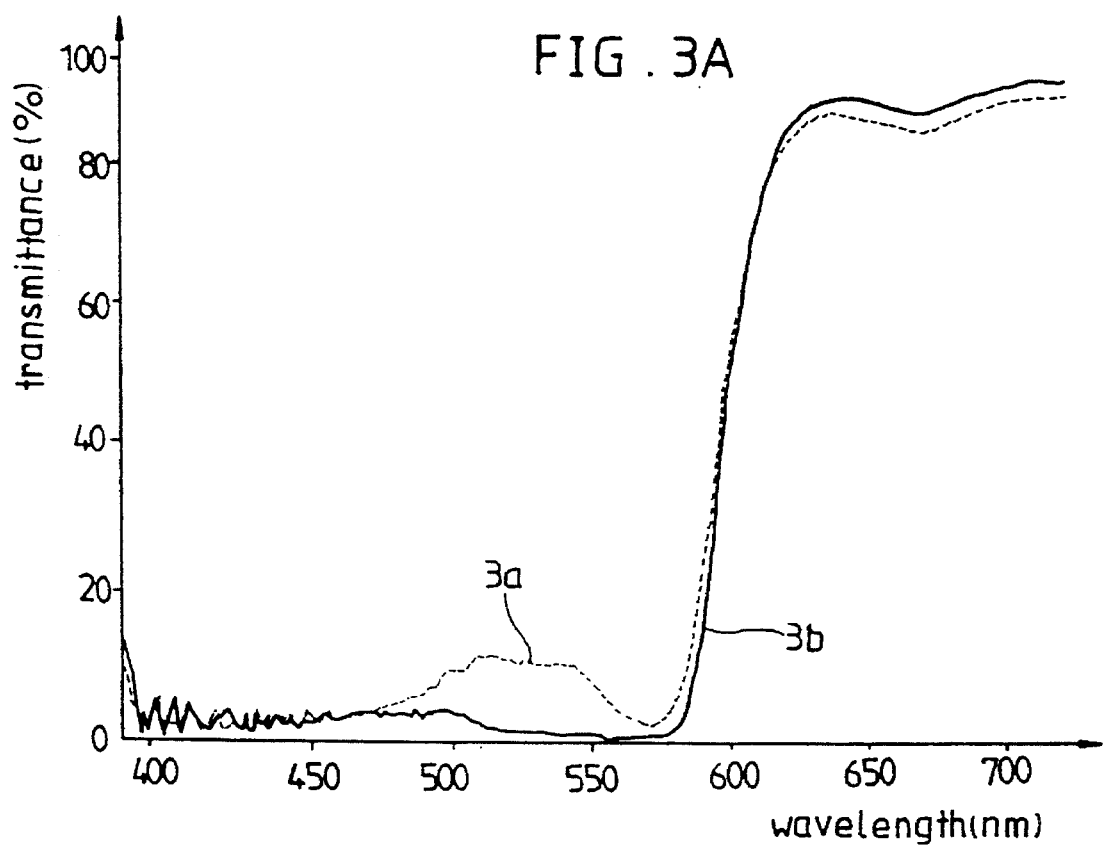
FIG. 3A illustrates light transmitting spectra for a conventional red color filter (3a) and a red color filter of the present invention (3b).
Figure 4A:
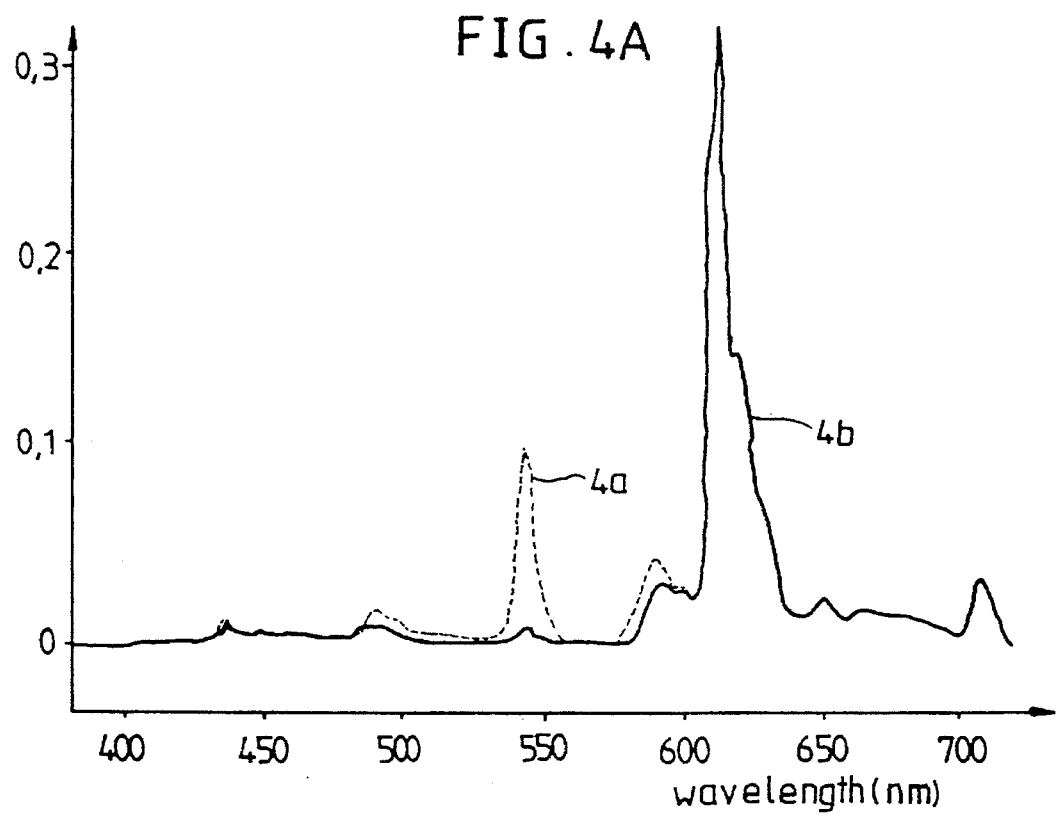
FIG. 4A illustrates light transmitting spectra when a conventional red color filter (4a) and a red color filter of the present invention (4b) transmits a backlight.

FIG. 3A illustrates the light transmitting spectra for a conventional red color filter (3a) together with a red color filter of the present invention (3b). As shown in FIG. 3A, the absorbance of the red color filter of the present invention is high at the 450 to 570 nm wavelength region, so it absorbs the light of the 450 to 570 nm wavelength region in the backlight when the red color filter of the present invention transmits the light (4b in FIG. 4A).

Figure 3B:
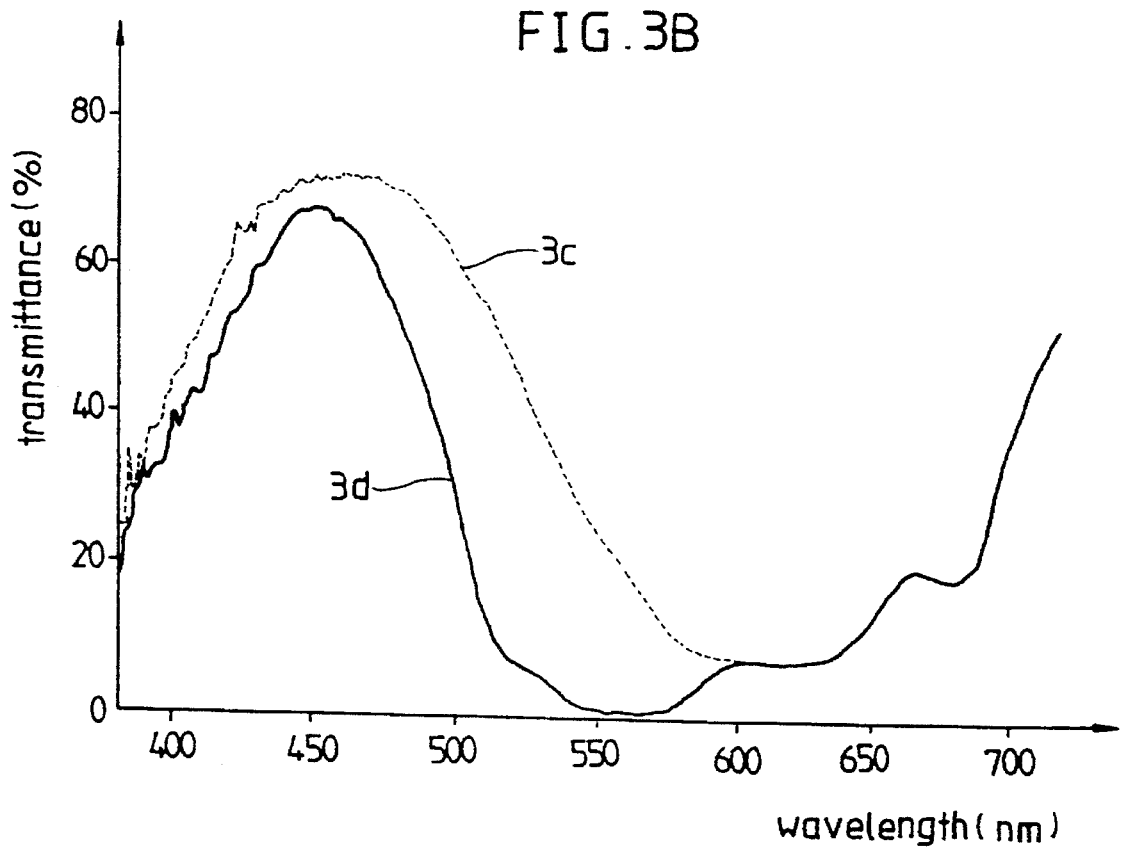
FIG. 3B illustrates light transmitting spectra for a conventional blue color filter (3c) and a blue color filter of the present invention (3d).
Figure 4B:
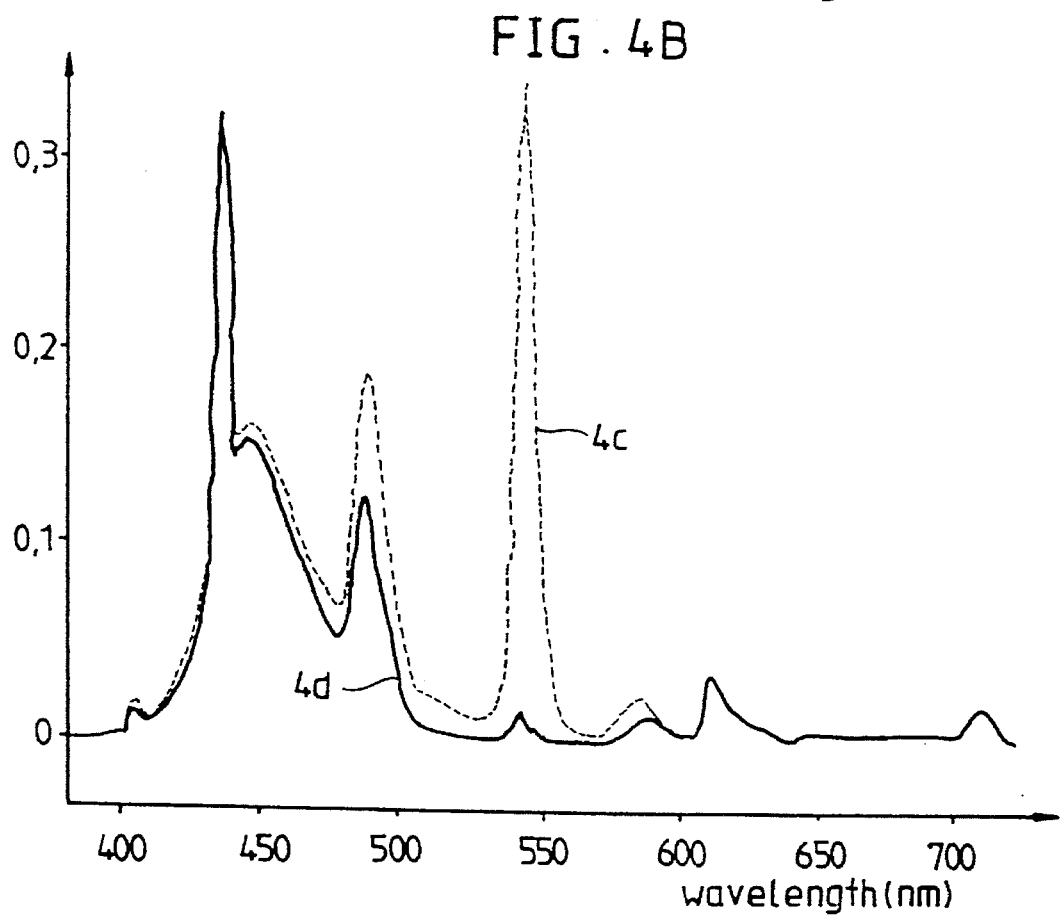
FIG. 4B illustrates light transmitting spectra when a conventional blue color filter (4c) and a blue color filter of the present invention (4d) transmits a backlight.

FIG. 3B illustrates the light transmitting spectra for a conventional blue color filter (3c) and a blue color filter of the present invention (3d). The blue filter of the present invention is shown to have high absorbance at the 450 to 570 nm wavelength region when comparing with the conventional blue filter. Therefore, the blue color filter of the present invention absorbs a great deal of the light of the 530 to 550 nm wavelength region, especially, in the backlight when the blue color filter of the present invention transmits the light (4d in FIG. 4B).

Figure 2:
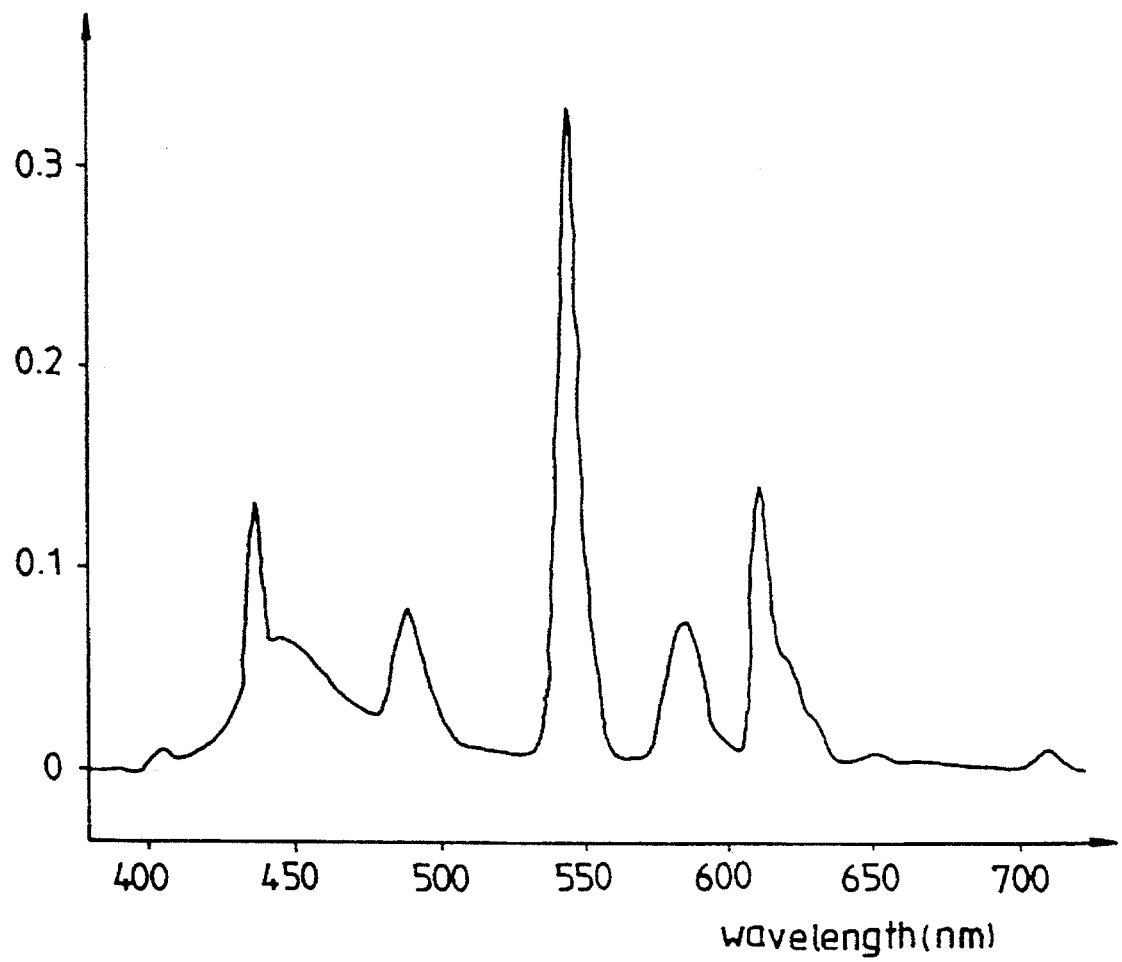
FIG. 2 illustrates a spectrum of a backlight for a conventional LCD.
Figure 5A:
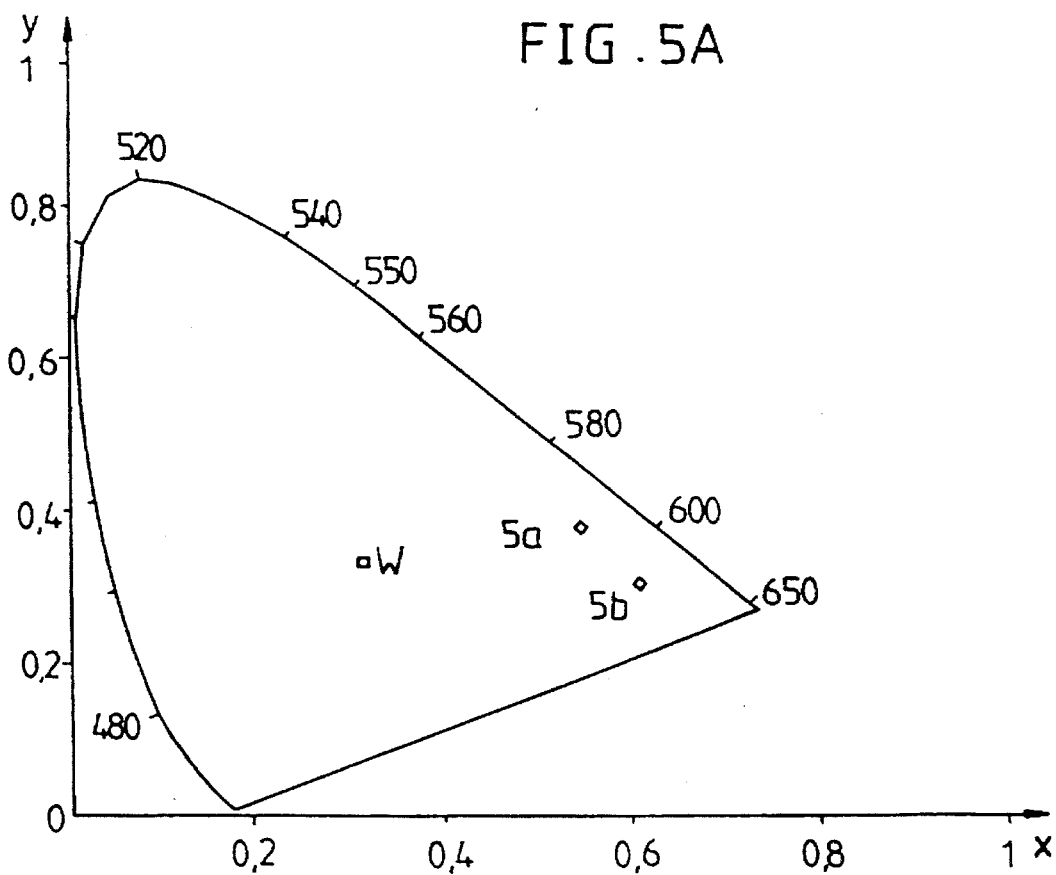
FIG. 5A illustrates a CIE diagram showing the location of the backlight illustrated in FIG. 2 when a conventional red color filter (5a) and a red color filter of the present invention (5b) transmits it.
Figure 5B:
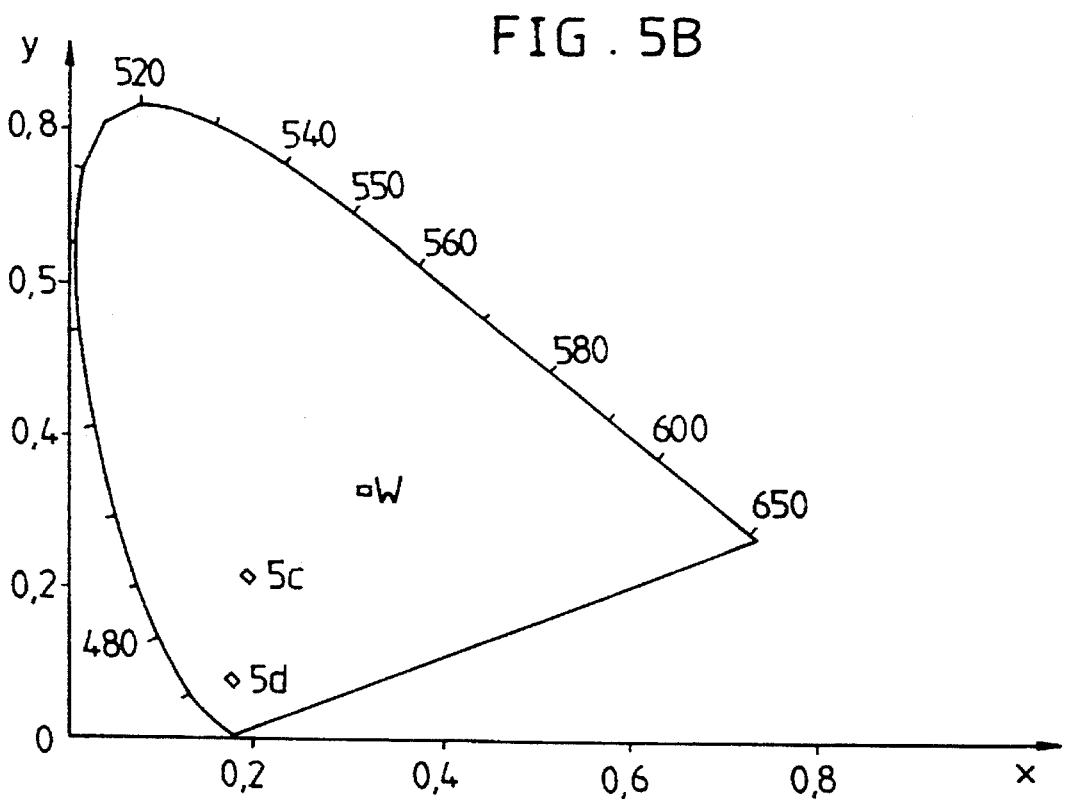
FIG. 5B illustrates a CIE diagram showing the location of the backlight illustrated in FIG. 2 when a conventional blue color filter (5c) and a blue color filter of the present invention (5d) transmits it.

FIG. 5A illustrates a CIE diagram showing the location of the backlight illustrated in FIG. 2 when a conventional red color filter (5a; x=0.5453, y=0.3790) and a red color filter of the present invention (5b; x=0.6076, y=0.3122) transmits it, and FIG. 5B illustrates a CIE diagram showing the location of the backlight illustrated in FIG. 2 when a conventional blue color filter (5c; x=0.1866, y=0.2124) and a blue color filter of the present invention (5d; x=0.1722, y=0.0750) transmits it.

As shown in FIG. 5A and 5B, the color purity of the light transmitted through the color filter of the present invention is markedly enhanced. Moreover, the color point region can be adjusted by changing the amount of the dyes used, so the color reproducing range becomes wide.

In conclusion, when applying the color filter of the present invention to an LCD, the red and blue color purities of the reproduced image are improved and so the quality of the picture becomes markedly enhanced.

What is claimed is:

1. A color filter for a liquid crystal display, said color filter being associated with a particular color, comprising a pair of substrates each having a transparent electrode formed thereon, said color filter comprising coloring materials of said particular color and resins provided on at least one of said substrates, wherein said color filter further comprises at least one dye selected from a group consisting of acid red 52, acid red 486 and rhodamine 6 GCT.

2. A color filter as claimed in claim 1, wherein said color filter is a red color filter.

3. A color filter as claimed in claim 1, wherein said color filter is a blue color filter.

4. A color filter as claimed in claim 1, wherein the amount of said dye ranges from 0.001 to 10 ppm based on the total weight of the color filter composition.

5. A color filter as claimed in claim 2, wherein the amount of said dye ranges from 0.001 to 10 ppm based on the total weight of the color filter composition.

6. A color filter as claimed in claim 3, wherein the amount of said dye ranges from 0.001 to 10 ppm based on the total weight of the color filter composition.

7. A color filter as claimed in claim 1, wherein the transmittance at the wavelength region of 450 to 570 nm, when said color filter transmits backlight, is 20% or below.

8. A color filter as claimed in claim 2, wherein the transmittance at the wavelength region of 450 to 570 nm, when said color filter transmits backlight, is 20% or below.

9. A color filter as claimed in claim 3, wherein the transmittance at the wavelength region of 450 to 570 nm, when said color filter transmits backlight, is 20% or below.

10. A color filter as claimed in claim 1, wherein said dye is coated on the surface of the color filter formed by using no dye.

11. A color filter as claimed in claim 2, wherein said dye is coated on the surface of the color filter formed by using no dye.

12. A color filter as claimed in claim 3, wherein said dye is coated on the surface of the color filter formed by using no dye.

13. A color filter as claimed in claim 1 wherein said at least one dye is acid red 52.

14. A color filter as claimed in claim 1 wherein said at least one dye is acid red 486.

15. A color filter as claimed in claim 1 wherein said at least one dye is rhodamine 6 GCT.

* * * * *